(12) United States Patent
Cheng et al.

(10) Patent No.: US 7,971,023 B2
(45) Date of Patent: Jun. 28, 2011

(54) GUARANTEED MEMORY CARD PERFORMANCE TO END-OF-LIFE

(75) Inventors: Steven S. Cheng, Sunnyvale, CA (US); Stephen Tam, Fremont, CA (US)

(73) Assignee: SanDisk Corporation, Milpitas, CA (US)

( * ) Notice: Subject to any disclaimer, the term of this patent is extended or adjusted under 35 U.S.C. 154(b) by 563 days.

(21) Appl. No.: 12/112,204

(22) Filed: Apr. 30, 2008

(65) Prior Publication Data

US 2009/0276570 A1    Nov. 5, 2009

(51) Int. Cl.
G06F 12/00    (2006.01)
G06F 13/00    (2006.01)
G06F 13/28    (2006.01)

(52) U.S. Cl. ......... 711/170; 711/104; 711/154; 711/167
(58) Field of Classification Search .................. 711/104, 711/154, 167, 170
See application file for complete search history.

(56) References Cited

U.S. PATENT DOCUMENTS

| | | | |
|---|---|---|---|
| 5,222,109 A | 6/1993 | Pricer | 377/24 |
| 5,341,339 A | 8/1994 | Wells | 365/218 |
| 5,619,452 A | 4/1997 | Miyachi | 365/185 |
| 5,754,567 A | 5/1998 | Norman | 371/40 |
| 6,081,878 A | 6/2000 | Estakhri et al. | 711/168 |
| 7,173,852 B2 | 2/2007 | Gorobets et al. | 365/185 |
| 7,215,580 B2 | 5/2007 | Gorobets | 365/189 |
| 7,224,607 B2 | 5/2007 | Gonzales et al. | 365/185 |
| 2001/0007541 A1* | 7/2001 | Hirakawa | 365/233 |
| 2008/0320267 A1* | 12/2008 | Bilger et al. | 711/170 |
| 2009/0190414 A1* | 7/2009 | Ogasawara | 365/189.09 |

* cited by examiner

Primary Examiner — Kevin L Ellis
Assistant Examiner — Ryan Bertram
(74) Attorney, Agent, or Firm — Weaver Austin Villeneuve & Sampson LLP

(57) ABSTRACT

In order to maintain a memory system's performance levels to its end-of-life, latency threshold level(s) are specified and associated with different memory system operating parameters. In one embodiment, the memory system monitors and gathers performance statistics in real time, and in accordance with specific memory transfer sizes. A current latency level can be dynamically calculated using the performance statistics and compared to previously established latency threshold levels. If the current latency level is greater than or equal to a specific latency threshold level, the memory system's configuration setting can be adjusted according to the operating parameters associated with the latency threshold level to offset the increased latency.

17 Claims, 4 Drawing Sheets

US 7,971,023 B2

GUARANTEED MEMORY CARD PERFORMANCE TO END-OF-LIFE

BACKGROUND OF THE INVENTION

This invention relates to methods for maintaining the performance of memory systems until end-of-life, in particular nonvolatile memory systems that include a memory controller.

Memory systems generally include multiple components which are in communication with each other and perform different functions as part of an overall system. One example of such a memory system is a nonvolatile memory system. Nonvolatile memory systems are used in various applications. Some nonvolatile memory systems are embedded in a larger system such as a personal computer. Other nonvolatile memory systems are removably connected to a host system and may be interchanged between different host systems. Examples of such removable memory systems (removable memory units) include memory cards and USB flash drives. Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls and supports operation of the memory cell array and interfaces with a host to which the card is connected. Memory card standards include PC Card, CompactFlash™ card (CF™ card), SmartMedia™ card, MultiMediaCard (MMC™), Secure Digital (SD) card, a miniSD™ card, microSD™ card, Memory Stick™, Memory Stick Duo card and microSD/TransFlash™ memory module standards to name a few. There are several USB flash drive products commercially available from SanDisk Corporation under its trademark "Cruzer®." Other examples of removable memory units include Solid State Drives (SSDs), e.g. using SATA, PCIe, ExpressCard or similar standards. SSDs use solid state memory systems in applications where Hard Disk Drives have traditionally been used, such as in laptop computers.

In many memory systems, degradation occurs with use over time, which prevents the memory system from maintaining its performance levels to its end-of-life. Degradation of the memory contributes to an increase of memory errors, which in turn leads to longer overall transfer times due in part to latency in transfers as more errors are detected and require correction.

SUMMARY

The disclosed embodiments act to offset the performance degradation such that a memory system can maintain a performance level to the end-of-life.

In one embodiment, a method is provided to establish latency threshold levels, which are dynamically compared to current levels of latency of a memory system determined using real-time performance statistics. If the current latency level is greater than or equal to a specific latency threshold level, then the memory system's configuration is adjusted to offset the increased latency such that the memory system can maintain its performance levels.

According to another embodiment of the present invention, error correction statistics are collected and stored by the memory system, in real-time and preferably according to predetermined memory transfer sizes. These error correction statistics are used to calculate a current latency level, which is then dynamically compared with previously established error correction latency threshold levels. If the current latency level is greater than or equal to a specific error correction latency threshold level, then the memory system's configuration is adjusted according to operating parameters associated with that threshold level to offset the increased error correction latency such that the memory system can maintain its performance levels.

Another aspect of the invention relates to a method of maintaining the performance of a memory system by monitoring and storing the memory system's error rate, in real-time and according to specified memory transfer sizes. This error rate can be calculated using the error correction statistics gathered by the memory system. As the memory error rate increases, the frequency of the clock signals controlling the error correction code ("ECC") circuit's pace of operation are increased to handle the increased memory error rate.

In another embodiment of the present invention, a memory system includes two ECC circuits which can be operated in parallel to quickly correct memory errors. As the memory system gathers and stores error correction statistics, a current memory rate can be dynamically calculated using the error correction statistics. This current memory error rate can be compared to previous memory error rates, and as the memory error rate increases, the second ECC circuit can be enabled and/or operated at a faster speed to help correct the increased number of memory errors.

DETAILED DESCRIPTION OF THE ILLUSTRATED EMBODIMENTS

Figure 1:
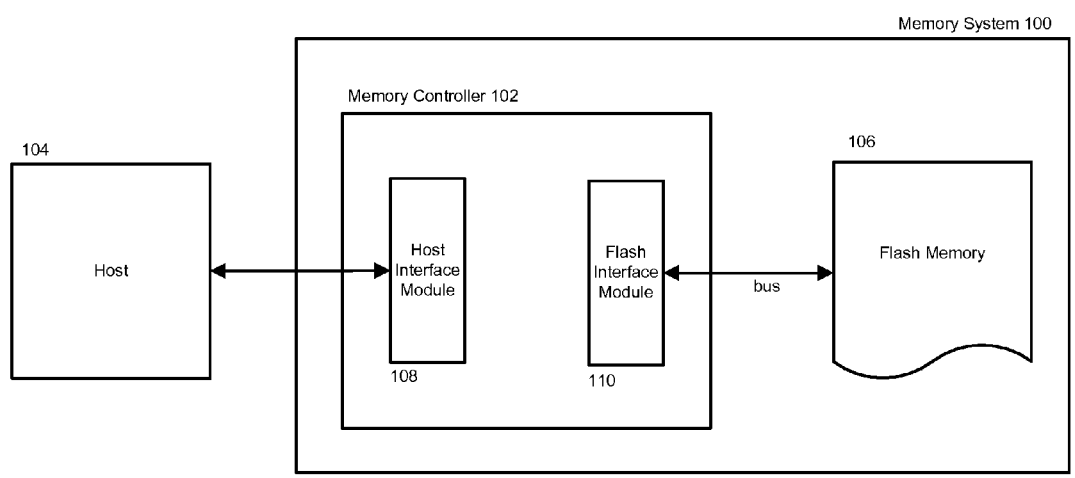
FIG. 1 illustrates a block diagram of an example memory system comprising a memory controller and flash memory according to an embodiment of the present invention.

FIG. 1 illustrates an exemplary non-volatile memory system 100. Other memory systems may also be used according to embodiments of the present invention, and the present invention is not limited to nonvolatile memory systems, or any other particular memory system. FIG. 1 shows a memory controller 102 that includes flash memory 106 and interfaces with a host 104, which is for example a digital camera, laptop computer, MP3 player, PDA, or other similar electronic device.

Memory system products, such as nonvolatile memory system 100, are often categorized by performance grades. For example, each line of memory card products is often offered in several different speeds for each memory card size. Memory transfer speeds are generally specified in both kilobytes per second (KB/s) and megabytes per second (MB/s). Sometimes, transfer speeds are also specified with an "x" rating system similar to that of CD-ROMS. The "x" is a reference to the minimum CD-ROM speed of 150 KB/s. Thus, "4x" is approximately equivalent to 600 KB/s, 16x is 2.4 MB/s, 40x is 6.0 MB/s, 66x is 10 MB/s, and 133x is 20 MB/s.

Each memory card manufacturer may offer more than one category of speed per memory card product, although this varies between manufacturers. As an example, secure digital ("SD") cards from some manufacturers come in basic, pro, and high-end varieties. Basic SD cards normally have transfer speeds rated between 1x to 16x, but manufacturers often do not guarantee a particular speed. Pro SD cards typically list a minimum transfer speed of 32x or higher; some pro SD cards operate upwards of 10 MB/s. High-end SD cards usually have guaranteed speeds of at least 66x, and can even operate at 133x or beyond. Flash memory speeds also differ between read, write, and erase operations. For example, a conventional single level cell NAND may operate at 40 MB/s for reading data and 20 MB/s for writing data. Note that all transfer speeds and classifications are only exemplary and tend to rapidly change, and should in no way limit the present application.

Different performance grades for flash memory cards give consumers the ability to select the grade that is most suitable for their intended use. For example, flash memory cards are often used in digital cameras. Regular consumers who use basic cameras may only need standard performance grades, whereas professional photographers may require higher performance grades. Faster transfer speeds are also desirable in other high-end applications such as video and graphics, and for using flash memory as a conventional hard drive replacement.

With higher performance flash memories, manufacturers can establish different performance grades for a specific product by operating at something less than the maximum transfer speed. This can be done in many ways, such as through the memory card's firmware, or by manipulating the system's clock signal frequencies. In general, as the frequency of the clock signal increases, the time to execute various operations or instructions by a logic circuit that is controlled by the clock signal decreases. Thus, a memory card could have, for example, three transfer speed modes, which can be controlled and selected by the firmware depending on the memory card performance type.

In most cases, the published read and write performance levels for memory cards can only be guaranteed on relatively new flash memories. This is because flash memory have endurance limits, and as a memory approaches its end-of-life ("EOL"), degradation of the floating-gate transistors leads to an increase in the number of data errors. During write operations, background garbage collection may be triggered to correct these errors using an error correction code. Thus, as the number of errors increases, latencies are introduced as more time and system resources are spent on correcting these errors, which contributes to the overall degradation of the memory performance. In most cases, a memory card approaching its EOL will not be able to meet the published minimum read and/or write performance levels. For further information on garbage collection please refer to U.S. patent application Ser. No. 11/541,371 entitled "Phased Garbage Collection" and filed on Sep. 29, 2006, hereby incorporated by reference in entirety.

Figure 2:
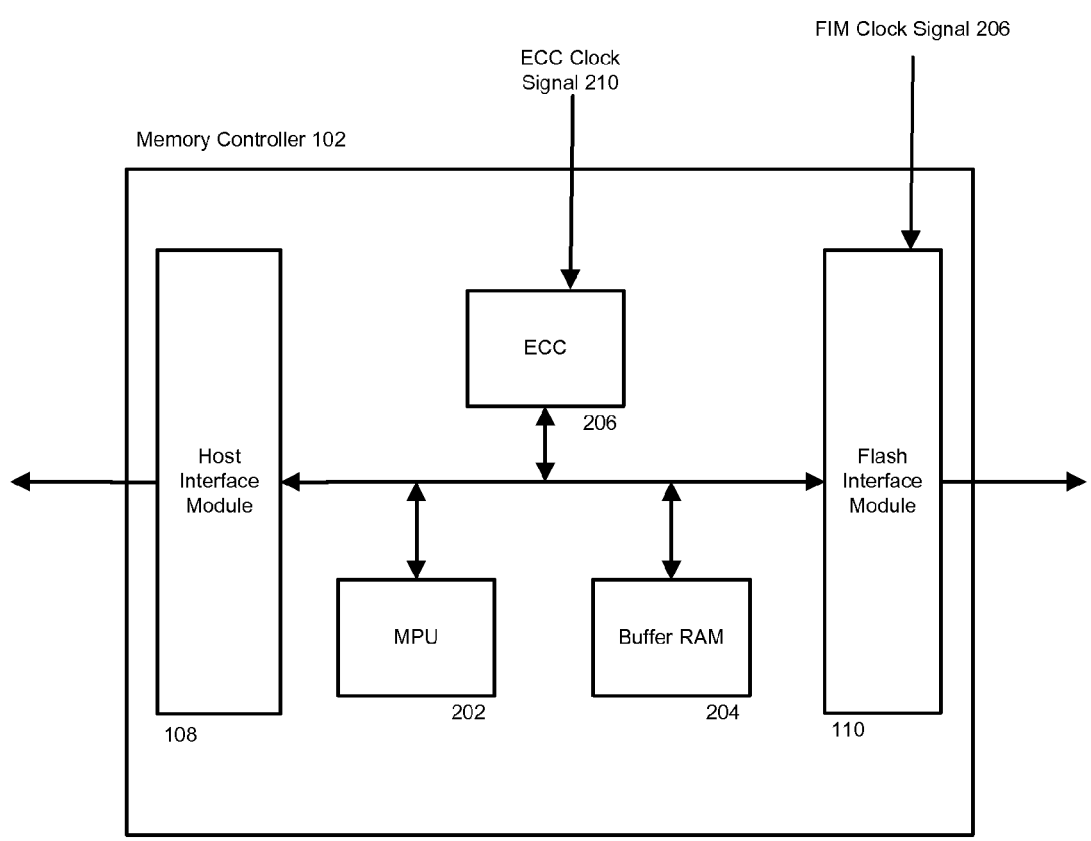
FIG. 2 illustrates the memory controller of FIG. 1 in more detail.

FIG. 2 illustrates an embodiment of the memory controller of FIG. 1. Memory controller 102 may be a component in a portable flash memory storage device, and comprises flash memory module 216 for accessing flash memory array 106, host interface module 214 for accessing host 104, microprocessor 202, buffer RAM 204, and ECC circuit 206. Microprocessor 202 provides overall control of the ECC circuit 206, host and flash interface modules 214 and 216, and all of the components of memory controller 102.

ECC circuit 206 and the flash interface module ("FIM") 216 receive clock signals 210 and 206, respectively. The frequency of these clock signals can be adjusted. For example, if the ECC circuit 206 encounters a large number of data errors, its clock signal frequency can be increased such that it can operate at a faster rate. Similarly, the clock signal frequency for FIM 216 can be increased to speed up the bus connecting the module with the flash memory array. Other internal components on memory controller 102 may also receive clock signals, which can be adjusted to vary the component's operating speed. In one embodiment, microprocessor 202 can control and adjust the frequencies of the various clock signals. One skilled in the art would understand that these clock signals can also be supplied from a source external to the memory controller, or be generated internally by a clock control circuit.

Host data for read and write operations is transferred between the memory controller and the flash memory array via FIM 216, which temporarily stores such data in buffer RAM 204. FIM 216 can detect data errors on the fly during this process. If no errors are detected, the data can be directly transferred to the host via host interface module ("HIM") 214. If errors are detected, ECC circuit 206 could be utilized to correct such errors before transferring the data to the host via HIM 214. As mentioned previously, memory errors may be caused by degradation as the memory is cycled and such errors typically increase as the memory reaches its EOL. ECC circuit 206 can correct such errors by using ECC techniques and circuitry to correct data signal errors. Error correction takes place regularly in the card and contributes to the latency that may be present when read/write operations are called for. Such latency typically increases during the life of the memory system. Different types of ECC can correct different numbers of bit errors and different types may be employed over time as the number of correctible errors increases with time.

Figure 3:
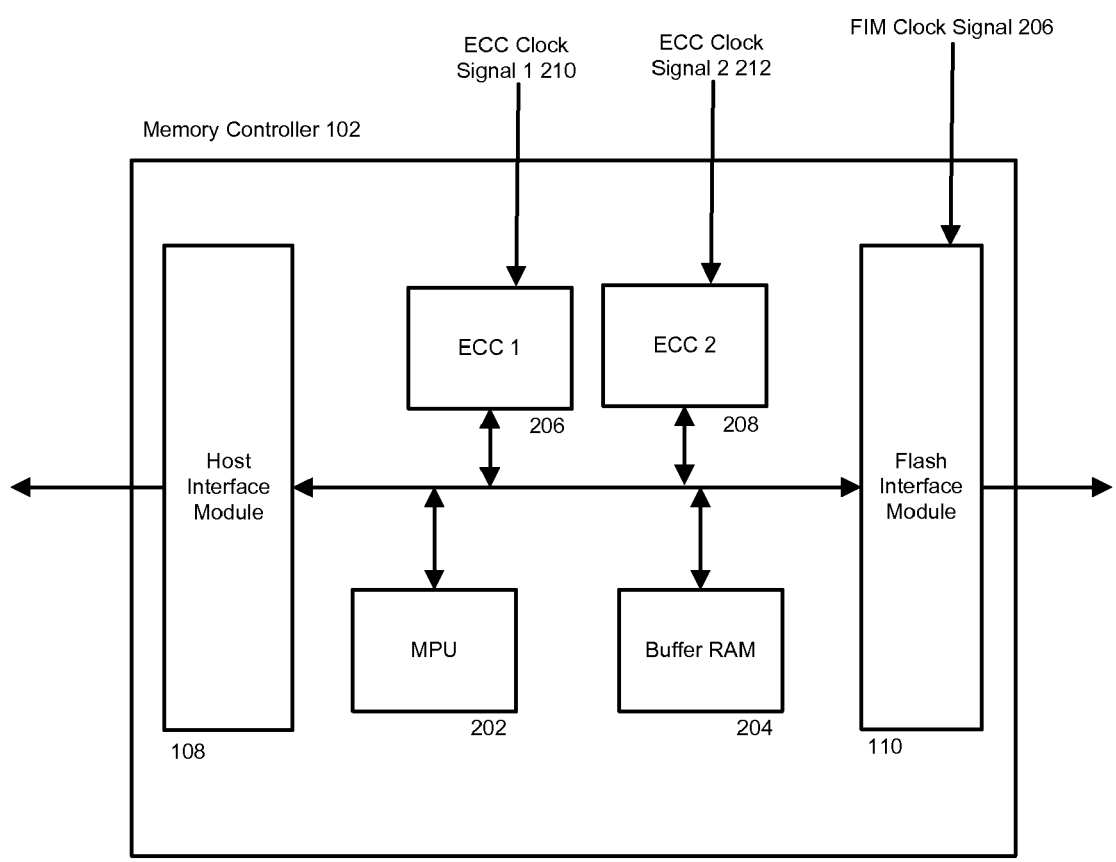
FIG. 3 illustrates another embodiment of the memory controller of FIG. 1 in more detail.

FIG. 3 shows an alternative embodiment of the memory controller of FIG. 1, which includes two ECC circuits. The first ECC circuit 206 receives ECC clock signal 210, and the second ECC circuit 208 receives ECC clock signal 212. In one embodiment, ECC circuit 206 can serve as the primary ECC circuit and ECC circuit 208 can serve as a supplemental ECC circuit. The supplemental ECC circuit can be enabled as the impact of error correction activity on the memory system increases. When the supplemental ECC engine is enabled, both ECC engines can be operated in parallel to complete the necessary error correction tasks faster. The speed at which each ECC engine operates can also be tuned independently by adjusting each ECC engine's clock signal frequency.

Figure 4:
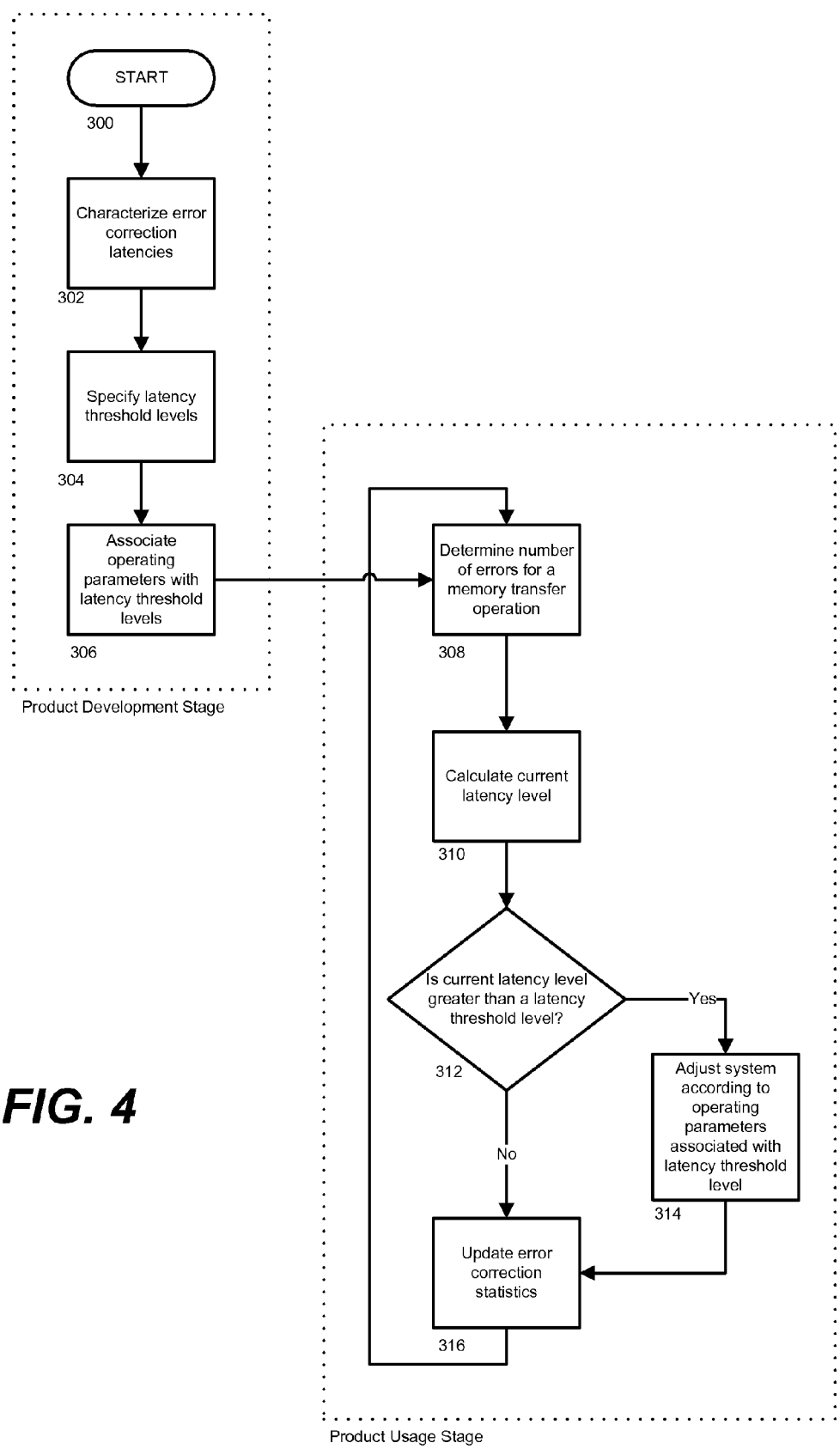
FIG. 4 illustrates a flowchart for adjusting the memory system's operating parameters based on previously specified latency threshold levels and the current latency level.

FIG. 4 shows a flowchart of a method for adjusting a memory system's operating parameters such that its performance levels can be maintained throughout the lifespan of the memory. This method starts with the characterization of error correction latencies in step 302. As an example, this characterization can be done by deliberately generating different types of data errors, and measuring the overall latencies introduced in the memory system for each type of error. First, a 0-bit error can be generated and the latency involved in transferring a specified transfer size of data with this 0-bit error can be measured. This would establish the baseline latency for the case where there is no data error, and thus no error correction activity.

Characterization can continue by generating 1-bit errors, and measuring the latency involved when the specified transfer size includes such 1-bit errors. For illustrative purposes, if the 0-bit error latency is 5 ms, and the 1-bit error latency is 15 ms, then the actual 1-bit error latency would be the difference between the 1-bit latency and the baseline, or 10 ms. The same process can be repeated for 2-bit errors, 3-bit errors, and so forth. Bit error latencies can also be characterized for various transfer sizes. For example, latencies can be measured for 1 MB, 10 MB, and 100 MB transfer sizes. These various transfer sizes correspond to the different uses of the memory card. For instance, memory cards used primarily for storing digital images will likely transfer data in a larger size compared to a memory card that is used for storing smaller word processing documents.

These error correction latencies can be characterized during product development, such as when the memory controller ASIC is developed and tested, or at other times as well. Once characterized and recorded, these latencies can also be used in step 304 to help establish a number of latency threshold levels that correspond to decreased memory performance over the lifespan of the memory. For example, decreased memory performance can be mimicked by generating a combination of different bit-errors, and the overall latency can be calculated using the characterization data. This overall latency can then be set as one latency threshold level that corresponds to a specific level of performance degradation. The process can be repeated with other combinations of bit-errors to represent other levels of performance degradation, to establish additional latency threshold levels.

Once a set of latency threshold levels are established, different memory system operating parameters can be associated with each latency threshold level in step 306. These operating parameters can be used to compensate or offset the ECC correction latency associated with each latency threshold level as compared to a desired level. This enables the memory system to substantially maintain its performance levels to the EOL. There are many different operating parameters that can be adjusted to increase the performance of the memory system. One main category of parameters are clock signal frequencies which can be manipulated to speed up (or slow down) the memory system and its various internal components. For example, ECC clock signal 210 can be initially set at 50 MHz, which can be increased using a frequency multiplier to a 100 MHz derived clock signal suitable for the operating parameters associated with a specific latency threshold level.

Manipulating the ECC clock would be appropriate in memory cards where the bit error correction activity is done in hardware (i.e., the gate logic in the memory controller ASIC) because in such a configuration the ECC speed is dependent on the ECC clock operating frequency. Where the error correction is done by software, it would be suitable to adjust the system clock (i.e., the microprocessor/MPU clock) since error correction in this configuration would depend on the MPU performance.

The frequency of FIM clock signal 206 can also be increased to help offset a particular level of ECC correction latency. This would increase the flash memory bus transfer speed to reduce the flash memory transfer times. If the flash memory can be operated in different performance modes, as discussed above, then these various modes can also serve as potential operating parameters that can increase the performance of the memory system. Other distinct system configuration settings including operating voltages and I/O buffer drive strengths, both of which can be adjusted to further increase the operating speed relative to an initial or any prior speed.

During actual operation, the memory controller can gather and store error correction statistics for predetermined transfer sizes in step 308. This provides the ability to quantify error correction latencies for a fixed time period based on the number of bit error corrections. In one embodiment, these error correction statistics can be logically stored in a matrix where the first dimension represents the different transfer sizes (i.e., 1 MB, 10 MB, 100 MB, etc.) and the second dimension represents the different bit error types (i.e., # of pages with 1-bit errors, # of pages with 2-bit errors, etc.). Each cell in this matrix would be a running average of the number of n-bit errors for a specific transfer size. For example, if the memory controller detects 3 2-bit errors for one transfer of 1 MB of data, the average for that cell (i.e., the cell corresponding to 2-bit errors for the 1 MB transfer size) would be updated with this new information.

At any moment in time, the memory controller can calculate the current latency level for a specific transfer size in step 310 by using a combination of the stored error correction statistics and the previously measured error correction latencies characterization, along with any other useful information that the memory system may be monitoring. For example, if the 1 MB transfer size currently has an average of 10 1-bit errors, 4 2-bit errors, and 6 4-bit errors, then the current latency level ("CLL") could be calculated as:

$$CLL = \sum_{n=1}^{N} C_n * L_n$$

where n is the type of bit error (n=1 means 1-bit error, n=2 means 2-bit error, etc.), N is largest number of bit errors, $C_n$ is the current average of the number of n-bit errors for the transfer size, and $L_n$ is the characterized error correction latency for n-bit errors. The CLL would therefore represent the current latency level for transferring 1 MB of data.

In a second alternative method, the second dimension of the matrix of error correction statistics would represent different ranges of latency levels, such as 100-200 ms, 200-300 ms, 300-400 ms, etc. Each cell would store the count of the number of times a specific transfer size is experiencing a particular latency level range. For example, the cell corresponding to the 1 MB transfer size and the 200-300 ms range would be the number of times the current latency level was in the 200-300 ms range. When the memory controller determines that another transfer operation of 1 MB of data is encountering, for example, a 125 ms error correction latency, as calculated using the above formula, then the count for the corresponding cell would be incremented by 1. Under this method, the current latency level could be calculated as the weighted average of the counts for each latency level range. A global current latency level can also be calculated as the weighted average of all current latency levels specific to a transfer size, where the weighting can take into account how frequent each transfer size occurs in the usage of the memory card.

A firmware mechanism or hardware logic can monitor the error correction group statistics and calculate the current latency levels in real-time. In step 312, the current latency level can be dynamically checked against each latency threshold level. If the current latency level exceeds a specific latency threshold level, then in step 314 the memory system configuration can be adjusted according to the operating parameters associated with that particular latency threshold level. For instance, a specific latency threshold level may call for an increase in the ECC clock signal frequency; if there is a second ECC circuit, then this supplemental ECC circuit can also be activated and run in parallel to increase the rate of error correction. These steps can then be repeated over the lifespan of the memory card to guarantee the flash memory card's performance to EOL.

A simpler embodiment of the present invention can be used where there are limited resources and calculating the current latency levels would be difficult. In this embodiment, the error correction statistics can be used in its raw form as representing specific memory error rates. For example, the total number of bit errors for a transfer size can be calculated for a specific time interval, and this number can be compared to subsequent error rates. As this memory error rate increases, various clock signal frequencies can be increased in a proportional manner to offset the longer latencies resulting from the increased error rate. If error correction is done through hardware, the ECC clock signal frequency can be adjusted, and if correction is done through software, the system clock signal frequency can be adjusted and any combination of HW/SW parameters may be adjusted in combination. Other operating parameters can also be used to offset the latencies. For example, operating voltages can also be gradually stepped-up in relation to the increasing memory error rate.

The above embodiments may be read in any memory system but are optimally employed in those with wear-leveling techniques. Without wear leveling, certain memory cells would be used more frequently than others. For example, memory blocks that store rapidly changing data would be rewritten more frequently compared to memory blocks used to store application programs that are not subject to frequent rewriting. Uneven wear on memory cells could lead to unrepresentative error correction statistics and inaccurate current latency level calculations because some memory cells would be closer to its EOL than others. Wear leveling alleviates or minimizes this problem by ensuring that bit errors will be fairly evenly distributed across the memory array.

Although the various aspects of the present invention have been described with respect to particular embodiments, it will be understood that the invention is entitled to protection within the full scope of the appended claims.

What is claimed is:

1. A method for maintaining the performance of a portable flash memory storage device which includes a set of device configuration settings, a non-volatile memory, the method comprising:
    establishing a first latency threshold level and a second latency threshold level;
    associating a first set of operating parameters with the first latency threshold level and a second set of operating parameters with the second latency threshold level;
    collecting and storing in real-time a group of performance statistics for the memory system;
    calculating a current latency level;
    comparing, dynamically, the current latency level with the first latency threshold level and the second latency threshold level; and
    adjusting the set of device configuration settings based on the first set of operating parameters if the current latency level is greater than or equal to the first latency threshold, and adjusting the set of device configuration settings based on the second set of operating parameters if the current latency level is greater than or equal to the second latency threshold.

2. The method of claim 1 wherein the current latency level is calculated based on the group of performance statistics.

3. The method of claim 1 wherein the memory system further includes an error detection and correction code (ECC) circuit, and wherein the first latency threshold and the second latency threshold are established using a set of benchmark error correction latencies.

4. The method of claim 3 wherein the group of performance statistics for the memory system includes error correction statistics, and wherein the current latency level is calculated using error correction statistics and the set of benchmark error correction latencies.

5. The method of claim 1 wherein the set of memory system configuration settings includes non-volatile memory bus operating frequencies.

6. The method of claim 3 wherein the set of device configuration settings includes ECC circuit operating frequencies.

7. The method of claim 1 wherein the set of device configuration settings includes operating voltages.

8. The method of claim 1 wherein the set of device configuration settings includes I/O buffer drive strengths.

9. A method for maintaining the performance of a memory system which includes a set of memory system configuration settings, a non-volatile memory, and an error detection and correction code (ECC) circuit, the method comprising:
    establishing a first latency threshold level and a second latency threshold level;
    associating a first set of operating parameters with the first latency threshold level and a second set of operating parameters with the second latency threshold level;
    collecting and storing in real-time a group of error correction statistics for the memory system according to predetermined memory transfer sizes;
    calculating a current latency level for using the group of error correction statistics;
    comparing, dynamically, the current latency level with the first latency threshold level and the second latency threshold level; and
    adjusting the set of memory system configuration settings based on the first set of operating parameters if the current latency level is greater than or equal to the first latency threshold, and adjusting the set of memory system configuration settings based on the second set of operating parameters if the current latency level is greater than or equal to the second latency threshold.

10. The method of claim 9 wherein the current latency level is calculated based on an average of current latency levels calculated for each predetermined memory transfer size, using a subset of the group of error correction statistics specific to each predetermined memory transfer size.

11. The method of claim 9 wherein the current latency level is calculated based on a current latency level calculated for a predetermined memory transfer size that is frequently occurring, using a subset of the group of error correction statistics specific to the predetermined memory transfer size.

12. The method of claim 9 wherein the first latency threshold and the second latency threshold are established using a set of benchmark error correction latencies.

13. The method of claim 12 wherein the current latency level is calculated further using the set of benchmark error correction latencies.

14. The method of claim 9 wherein the set of memory system configuration settings includes non-volatile memory bus operating frequencies.

15. The method of claim 9 wherein the set of memory system configuration settings includes ECC circuit operating frequencies.

16. The method of claim 9 wherein the set of memory system configuration settings includes operating voltages.

17. The method of claim 9 wherein the set of memory system configuration settings includes I/O buffer drive strengths.

* * * * *